US012038136B2

(12) United States Patent
Deletre et al.

(10) Patent No.: US 12,038,136 B2
(45) Date of Patent: Jul. 16, 2024

(54) SEALED AND THERMALLY INSULATING TANK HAVING ANTI-CONVECTION INSULATING SEALS

(71) Applicant: GAZTRANSPORT ET TECHNIGAZ, Saint Remy les Chevreuse (FR)

(72) Inventors: Bruno Deletre, Saint Remy les Chevreuse (FR); Jean-Yves Le Stang, Saint Remy les Chevreuse (FR); Charles Gimbert, Saint Remy les Chevreuse (FR); Jean-Damien Capdeville, Saint Remy les Chevreuse (FR); Vincent Lorin, Saint Remy les Chevreuse (FR); Edouard Brugiere, Saint Remy les Chevreuse (FR)

(73) Assignee: GAZTRANSPORT ET TECHNIGAZ, Saint Remy les Chevreuse (FR)

( * ) Notice: Subject to any disclaimer, the term of this patent is extended or adjusted under 35 U.S.C. 154(b) by 141 days.

(21) Appl. No.: 17/771,783

(22) PCT Filed: Nov. 12, 2020

(86) PCT No.: PCT/EP2020/081973

§ 371 (c)(1),
(2) Date: Apr. 25, 2022

(87) PCT Pub. No.: WO2021/094493

PCT Pub. Date: May 20, 2021

(65) Prior Publication Data

US 2022/0373133 A1 Nov. 24, 2022

(30) Foreign Application Priority Data

Nov. 13, 2019 (FR) ....................................... 1912653

(51) Int. Cl.
*F17C 3/02* (2006.01)

(52) U.S. Cl.
CPC ...... *F17C 3/027* (2013.01); *F17C 2201/0157* (2013.01); *F17C 2201/052* (2013.01);
(Continued)

(58) Field of Classification Search
CPC .. F17C 3/027; F17C 3/025; F17C 3/02; F17C 1/12; F17C 2203/0358; F17C 2209/238;
(Continued)

(56) References Cited

U.S. PATENT DOCUMENTS 3,782,053 A * 1/1974 Nakano .................. F17C 13/00 220/62.2
2015/0375830 A1* 12/2015 Bougault ................ F17C 3/027 220/592.26

FOREIGN PATENT DOCUMENTS

CN 101357675 A 2/2009
CN 104955722 A 9/2015
(Continued)

OTHER PUBLICATIONS

International Search Report for corresponding PCT application No. PCT/EP2020/081973, mailed Feb. 16, 2021.
(Continued)

*Primary Examiner* — Stephen J Castellano
(74) *Attorney, Agent, or Firm* — Notaro, Michalos & Zaccaria P.C.

(57) ABSTRACT

A sealed and thermally insulating tank including a thermally insulating barrier suitable for being anchored to a load-bearing structure is disclosed. The thermally insulating barrier including a plurality of insulating panels juxtaposed in a regular pattern, two adjacent insulating panels defining an inter-panel space, the inter-panel space including an outer portion and an inner portion superposed in the direction of the thickness of the thermally insulating barrier, the outer portion being suitable for being situated close to the load-
(Continued)

bearing structure and the inner portion being close to the inside of the tank, the tank further including insulating seals, the insulating seals including two outer insulating seals, the said outer insulating seals being arranged juxtaposed in the outer portion of the inter-panel space so that they have two adjacent edges, and an inner insulating seal, the inner insulating seal being arranged in the inner portion of the inter-panel space.

21 Claims, 4 Drawing Sheets

(52) U.S. Cl.
CPC ................. *F17C 2203/0333* (2013.01); *F17C 2203/0358* (2013.01); *F17C 2209/232* (2013.01); *F17C 2209/238* (2013.01)

(58) Field of Classification Search
CPC ...... F17C 2201/0157; F17C 2270/0107; F17C 2203/0329
See application file for complete search history.

(56) References Cited

FOREIGN PATENT DOCUMENTS

| | | | |
|---|---|---|---|
| CN | 106662291 | A | 5/2017 |
| CN | 107110428 | A | 8/2017 |
| CN | 109563965 | A | 4/2019 |
| DK | 200501559 | A | 5/2006 |
| FR | 2599468 | A1 | 12/1987 |
| FR | 2691520 | A1 | 11/1993 |
| FR | 2724623 | A1 | 3/1996 |
| JP | 5466547 | B2 | 4/2014 |
| KR | 20190058885 | A | 5/2019 |
| WO | 2014057221 | A2 | 4/2014 |
| WO | 2017212200 | A2 | 12/2017 |
| WO | 2019102163 | A1 | 5/2019 |
| WO | 2019155158 | A1 | 8/2019 |

OTHER PUBLICATIONS

Chinese office action for corresponding Chinese application No. 202080078964.1, issued Feb. 10, 2023 with English translation.

Sung Woong Choi, "Creative Commons Deed Collection, Numerical and experimental study on flow and heat transfer characteristics of cryogenic liquid in porous media", School of Mechanical and Aerospace Engineering Seoul National University, Feb. 1, 2013, Seoul, Korea.

Hee Bum Lee et al., "Liquid Flow and Ev a pora tion Simulation of Cryogenic Fluid in the Wall of Cryogenic Fluid Cargo Containment System", Korea Computational and Fluid Engineering Society: Conference Proceedings, Korean Society of Computational Fluids Engineering, Oct. 24, 2008, Seoul, Korea, pp. 308-315.

* cited by examiner

SEALED AND THERMALLY INSULATING TANK HAVING ANTI-CONVECTION INSULATING SEALS

This application is the national stage (Rule 371) of international application No. PCT/EP2020/081973 filed 2 Nov. 2020.

TECHNICAL FIELD

The invention relates to the field of sealed and thermally insulating membrane tanks. In particular, the invention relates to the field of sealed and thermally insulating tanks for storing and/or transporting liquefied gas at low temperatures, such as tanks for transporting Liquefied Petroleum Gas (also called LPG) having for example a temperature of between −50° C. and 0° C., or for transporting Liquefied Natural Gas (LNG) at approximately −162° C. at atmospheric pressure. These tanks can be installed on shore or on a floating structure. In the case of a floating structure, the tank can be for transporting liquefied gas or receiving liquefied gas used as a fuel to propel the floating structure.

In one embodiment, the liquefied gas is LNG, i.e. a high-methane-content mixture stored at a temperature of approximately −162° C. at atmospheric pressure. Other liquefied gases can also be envisaged, particularly ethane, propane, butane and ethylene. Liquefied gases can also be stored under pressure, for example at a relative pressure of between 2 and 20 bar, and in particular at a relative pressure in the vicinity of 2 bar. The tank can be produced using different techniques, particularly in the form of an integrated membrane tank or a structural tank.

TECHNOLOGICAL BACKGROUND

FR2724623 and FR2599468, for example, describe a wall structure for producing the flat wall of a sealed and thermally insulating tank. Such a tank wall includes a multi-layer structure including, from the outside of the tank to the inside of the tank, a secondary thermally insulating barrier, a secondary sealing membrane, a primary thermally insulating barrier and a primary sealing membrane suitable for being in contact with the liquid contained in the tank. Such tanks include insulating panels juxtaposed so that they form the thermally insulating barriers. In addition, in order to ensure the continuity of the insulating properties of said thermally insulating barriers, insulating seals are inserted between two adjacent insulating panels.

These insulating seals are inserted into all of the inter-panel spaces formed between two adjacent insulating panels and extend through the entire thickness of the corresponding thermally insulating barrier. Such insulating seals are juxtaposed in succession in the inter-panel spaces in order to ensure the continuity of the insulation of the thermally insulating barrier.

The juxtaposition of the insulating seals leads however to the creation, between the insulating seals, of channels extending through the entire thickness of the thermally insulating barrier. The presence of such channels can be linked to a number of causes, for example the manufacturing tolerances of the insulating seals or the thermal contraction of the insulating seals when the tank is chilled, for example when LNG at −162° C. is loaded into the tank. Such channels promote natural convection in the thermally insulating barrier, in particular when these channels have a vertical component relative to the Earth's gravity, and can give rise to a thermosyphon phenomenon that reduces the insulating properties of the thermally insulating barrier. Such a tank is not therefore entirely satisfactory.

SUMMARY

One idea behind the invention is that of proposing a sealed and thermally insulating tank with a sealing membrane in which the convection phenomena in the thermally insulating barriers are reduced. In particular, one idea behind the invention is that of providing a sealed and thermally insulating tank that limits the presence or appearance of channels extending through the entire thickness of the thermally insulating barriers in order to limit the natural convection phenomena in said thermally insulating barriers. A further idea behind the invention is that of facilitating the manufacturing of such a tank. In particular, one idea behind the invention is that of facilitating the insertion of the insulating seals into the inter-panel spaces.

According to one embodiment, the invention provides a sealed and thermally insulating tank including a thermally insulating barrier suitable for being anchored to a load-bearing structure, the thermally insulating barrier including two adjacent insulating panels, an inter-panel space being defined between the two adjacent insulating panels, said inter-panel space including an outer portion and an inner portion that are superposed in the direction of the thickness of the thermally insulating barrier, the outer portion and the inner portion being further away from and closer to the inside of the tank respectively, the tank further including:

- two outer insulating seals juxtaposed in the outer portion of the inter-panel space so that they have two adjacent edges, and
- an inner insulating seal arranged in the inner portion of the inter-panel space, the inner insulating seal being superposed in the direction of the thickness of the thermally insulating barrier on the two outer insulating seals so that it covers the two adjacent edges of said outer insulating seals.

Such a sealed and thermally insulating tank has good insulating properties of the thermally insulating barrier. In particular, such a sealed and thermally insulating tank makes it possible to limit convection phenomena in the thermally insulating barrier. The presence of outer insulating seals and an inner insulating seal superposed in the direction of the thickness of the thermally insulating barrier, associated with the superposed positioning of the inner insulating seal in the direction of the thickness of the thermally insulating barrier on the adjacent edges of the juxtaposed outer insulating seals, prevents the presence or appearance of channels extending continuously through the entire thickness of the thermally insulating barrier. A channel developing at the interface between the adjacent edges of the outer insulating seals can only extend through the thickness of the outer portion of the inter-panel space due to the overlapping of this interface by the inner insulating seal.

In addition, such outer and inner insulating seals are simple and easy to install due to the reduced footprint of the outer and inner insulating seals, said outer and inner insulating seals being of a reduced size due to the positioning thereof over a portion of the thickness of the thermally insulating barrier and not over the entire thickness thereof.

According to embodiments, such a sealed and thermally insulating tank can include one or more of the following features.

According to one embodiment, the inner insulating seal and/or the two outer insulating seals are gas-permeable.

Such insulating seals make it possible to ensure the continuity of the thermally insulating barrier between the two adjacent insulating panels while permitting the circulation of gas within the thermally insulating barrier. Such insulating seals are thus particularly suitable for allowing the maintenance of an inert atmosphere in the thermally insulating barrier or for performing leak tests on a sealing membrane of the tank without preventing the satisfactory circulation of the inert gas. Such insulating seals have for example an intrinsic permeability greater than $5.10^{-10} m^2$, advantageously greater than $6.5.10^{-11} m^2$, and preferably greater than $5.10^{-10} m^2$. Advantageously, this intrinsic permeability is less than $1.10^{-8} m^2$ and advantageously less than $8.10^{-9} m^2$.

According to one embodiment, the outer and inner insulating seals are compressible. According to one embodiment, one or both of said outer insulating seals has, in the free state, i.e. in the absence of compressive stress, a width larger than or equal to the width of the inter-panel space. According to one embodiment, the inner insulating seal has, in the free state, i.e. in the absence of compressive stress, a width larger than or equal to the width of the inter-panel space.

According to one embodiment, the outer and inner insulating seals are made from solid materials and have elastic properties so that they can adopt, under the action of a compressive stress, a compressed state in which said insulating seals have a width smaller than a width of the inter-panel space so that they can be inserted into said inter-panel space and, when said insulating seals are inserted into said inter-panel space and in the absence of said compressive stress, can adopt a semi-expanded state in which said insulating seals are constrained by the insulating panels forming the inter-panel space and fill the width of said inter-panel space.

Due to these properties, the outer insulating seals are easy to insert into the inter-panel spaces in their compressed state while ensuring satisfactory continuity of the insulation in the semi-expanded state. In particular, the dimensions of the insulating seals in the compressed state allow easy insertion into the inter-panel space. In addition, the semi-expanded state constrained by the insulating panels ensures the satisfactory positioning of the insulating seals over the entire width of the inter-panel space and therefore the satisfactory continuity of the insulation.

According to one embodiment, the inner insulating seal has, in the free state, i.e. in the absence of compressive stress, a width larger than the width of one or both of said outer insulating seals in the free state.

According to one embodiment, the inner and/or outer insulating seal is made up at least of an insulating material included in the following group of materials: glass wool, rock wool, low-density polyurethane foam and melamine foam.

According to one embodiment, the outer insulating seal(s) has/have, in the free state, a width slightly larger than the width of the inter-panel space so that said outer insulating seal(s) is/are only very slightly compressed in order to be inserted into the inter-panel space. For example, the outer insulating seal(s), in the inserted state in the inter-panel space, is/are compressed in the direction of the width of the inter-panel space by less than 50%, for example of the order of 5% to 20%. Such an outer insulating seal is simple to insert into the inter-panel space due to its low compression in order to have a width smaller than the width of the inter-panel space while filling the entire width of the inter-panel space once accommodated in the inter-panel space.

According to one embodiment, one or both of said outer insulating seals has, in the free state, a width smaller than or equal to the width of the inter-panel space. Such an outer insulating seal is simple to insert into the inter-panel space as it does not require compression in order to be accommodated in the inter-panel space. In this embodiment, it is preferable that the inner insulating seal has, in the free state, a width larger than the width of the inter-panel space so that it has a semi-compressed state between the insulating panels forming the inter-panel space. The outer insulating seal(s) is/are thus simple to insert into the inter-panel space and the inner insulating seal, in its semi-compressed state, fills the entire width of the inter-panel space, preventing the formation of channels extending through the entire thickness of the thermally insulating barrier when it is accommodated in the inter-panel space.

According to one embodiment, the outer insulating seals and the inner insulating seal have a different height in the direction of the thickness of the thermally insulating barrier.

Due to these properties, it is possible to adapt the dimension of the outer insulating seals and the inner insulating seals in the direction of the thickness of the thermally insulating barrier as required. According to one embodiment, the inner insulating seals thus have a dimension in the direction of the thickness of the thermally insulating barrier that is smaller than the dimension in said direction of thickness of the outer insulating seals. This embodiment makes it possible to reduce the dimension in the direction of the thickness of the thermally insulating barrier of the interface between two inner insulating seals. This reduction in said dimension thus limits the size of any channels that might form at said interface. Such channels, being situated near the inside of the tank, would be capable of containing the largest temperature variations. Limiting the size of these channels therefore makes it possible to limit potential natural convection phenomena in the thermally insulating barrier.

According to one embodiment, the outer and inner insulating seals are parallelepipedal.

Such a shape of insulating seal enables simple handling and easy insertion into the inter-panel space.

According to one embodiment, the outer insulating seals and/or the inner insulating seal further comprise a core of compressible porous material and a sleeve fully or partially surrounding said core.

According to one embodiment, the sleeve is made from a flexible material such as kraft paper, a composite material or a polymer film.

According to one embodiment, the sleeve is gas-permeable. That is, the sleeve has a sufficiently high leakage rate to allow the circulation of gas through the insulating seal.

According to one embodiment, the sleeve is made up of a plurality of elements fully or partially covering the faces and/or the vertices and/or the edges of the outer insulating seals or the inner insulating seal. According to one embodiment, the plurality of elements of the sleeve can be:

- parallelepipedal, for example square, and preferably rectangular, so that they can be placed on the faces of the outer insulating seals or the inner insulating seal; or
- angled, so that they can be placed on the vertices or edges of the outer insulating seals or the inner insulating seal.

According to one embodiment, the outer insulating seals and the inner insulating seal have a rectangular parallelepipedal shape defined by first and second faces opposite each other in the direction of the thickness of the thermally insulating barrier, third and fourth faces opposite each other in a longitudinal direction of the inter-panel space, and fifth and sixth faces opposite each other in a transverse direction of the inter-panel space, and the outer insulating seals and the inner insulating seal each comprise a core of compressible material and at least one compressible insulating strip rigidly connected to the core of compressible material and forming at least one of the first face, second face, third face and fourth face of said outer or inner insulating seal. For example, the outer insulating seals and the inner insulating seal comprise three compressible insulating strips rigidly connected to the core of compressible material and respectively form three faces selected from the first face, second face, third face and fourth face of said outer or inner insulating seal.

According to a preferred embodiment, the outer insulating seals and the inner insulating seal each comprise a core of compressible material and first, second, third and fourth compressible insulating strips rigidly connected to the core of compressible material and respectively forming the first face, the second face, the third face and the fourth face of said outer or inner insulating seal.

By means of such an arrangement, a flexible additional thickness is added by the compressible insulating strips and makes it possible to limit the presence of play that might be created between the outer insulating seals and between the outer insulating seals and the inner insulating seal when they contract. This therefore makes it possible to reduce the convection resulting from the thermal contraction of the materials. In other words, the compressible insulating strips make it possible to reduce or even eliminate the flow of nitrogen through the inter-panel space.

According to one embodiment, the fifth and sixth faces are not provided with compressible insulating strips.

According to one embodiment, the core of compressible material has a compressive stiffness in the transverse direction of the inter-panel space, a compressive stiffness in the direction of the thickness of the wall and a compressive stiffness in the longitudinal direction of the inter-panel space, the compressive stiffness in the transverse direction of the inter-panel space being lower than the compressive stiffness in the direction of the thickness of the wall and than the compressive stiffness in the longitudinal direction of the inter-panel space.

According to one embodiment, the core of compressible material includes glass wool having fibres the longitudinal directions of which each extend substantially in a plane orthogonal to the transverse direction of the inter-panel space.

According to one embodiment, the first and second compressible insulating strips have a compressive stiffness measured in the direction of the thickness of the thermally insulating barrier that is lower than that of the core of compressible material.

According to one embodiment, the third and fourth compressible insulating strips have a compressive stiffness measured in the longitudinal direction of the inter-panel space that is lower than that of the core of compressible material.

According to one embodiment, the compressible insulating strips are made from a material selected from: polyurethane foam, polyvinyl chloride (PVC) foam, polystyrene, cotton wool and glass wool. Preferably, the compressible insulating strip is made from low-density foam. A foam is considered to be low-density when the density of the foam is between 25 and 45 kg/m$^3$.

According to one embodiment, the thickness of the compressible insulating strip is between 3 millimeters (mm) and 80 mm, preferably between 5 mm and 50 mm.

According to one embodiment, the compressible insulating strip can be: paralellepipedal, for example square, and preferably rectangular.

According to one embodiment, the compressible insulating strips are attached to the sleeve.

According to one embodiment, the compressible insulating strip is attached by adhesive bonding or stapling.

According to one embodiment, the length and/or width of the compressible insulating strip is equal to the length and/or the width of the sleeve of the insulating seal.

According to another aspect, the invention relates to a sealed and thermally insulating tank including a thermally insulating barrier suitable for being anchored to a load-bearing structure, the thermally insulating barrier including two adjacent insulating panels, an inter-panel space being defined between the two adjacent insulating panels, the tank further including:

- at least one insulating seal accommodated in the inter-panel space, in which the insulating seal has a rectangular parallelepipedal shape defined by first and second faces opposite each other in the direction of the thickness of the thermally insulating barrier, third and fourth faces opposite each other in a longitudinal direction of the inter-panel space, and fifth and sixth faces opposite each other in a transverse direction of the inter-panel space,
- in which the insulating seal comprises a core of compressible material and first, second, third and fourth compressible insulating strips rigidly connected to the core of compressible material and respectively forming the first face, the second face, the third face and the fourth face of said insulating seal.

According to one embodiment, the tank further includes a plurality of insulating panels juxtaposed in a regular pattern and a plurality of inter-panel spaces, said inter-panel spaces each being defined by two adjacent insulating panels of the plurality of insulating panels, said inter-panel spaces each including an outer portion and an inner portion superposed in the direction of the thickness of the thermally insulating barrier, the outer portion and the inner portion being respectively further away from and closer to the inside of the tank, the tank further including:

- a plurality of outer insulating seals arranged in the outer portions of the inter-panel spaces, said outer insulating seals being juxtaposed in pairs so that they have two adjacent edges,
- a plurality of inner insulating seals arranged in the inner portions of the inter-panel spaces, said inner insulating seals being arranged superposed in the direction of the thickness of the thermally insulating barrier on two respective juxtaposed outer insulating seals so that it covers the adjacent edges of said two outer insulating seals.

According to one embodiment, two inner insulating seals of the plurality of inner seals are juxtaposed so that two adjacent edges of said two inner seals are arranged in line with an outer insulating seal. In other words, an interface between two inner insulating seals is arranged over an outer insulating seal.

According to one embodiment, the plurality of inter-panel spaces includes a first series of adjacent inter-panel spaces in pairs and aligned in a first alignment direction, and a first series of outer insulating seals of the plurality of outer insulating seals and a first series of inner insulating seals of the plurality of inner insulating seals are arranged continuously in the inter-panel spaces of said first series of inter-panel spaces so that at least one of the outer insulating seals of said first series of outer insulating seals and the inner insulating seals of said first series of inner insulating seals forms a joint seal that is arranged overlapping in two successive inter-panel spaces of the first series of inter-panel spaces.

According to one embodiment, the inner insulating seals of the first series of inner insulating seals are juxtaposed so that the adjacent edges of two juxtaposed inner insulating seals are situated in line with an outer insulating seal of the first series of outer seals.

According to one embodiment, the inner insulating seals of the first series of inner insulating seals and the outer insulating seals of the first series of outer insulating seals are in a staggered arrangement.

Due to these features, the thermally insulating barrier continuously has good thermal insulation properties.

According to one embodiment, the first alignment direction has a vertical component.

Due to these features, the formation of channels in the inter-panel spaces is avoided in the areas of the thermally insulating barrier that are most subject to natural convection phenomena.

According to one embodiment, the tank further includes a second series of adjacent inter-panel spaces in pairs and aligned in a second alignment direction, the first alignment direction and the second alignment direction being secant so that said joint seal passes through an intersection between the first series of inter-panel spaces and the second series of inter-panel spaces, the tank further including an insulating seal accommodated in the second series of inter-panel spaces so that it is juxtaposed to said joint seal.

According to one embodiment, the insulating seal accommodated in the second series of inter-panel spaces is, at ambient temperature, in a compressed state in the second alignment direction.

According to one embodiment, the insulating seal accommodated in the second series of inter-panel spaces has a dimension taken in the second alignment direction that is smaller in the compressed state than said dimension of said insulating seal taken in said direction in a free state, that is, without compressive stress in said direction, at low temperatures, typically at −162° C.

Due to these features, the insulating seal accommodated in the second series of inter-panel spaces remains in contact with the insulating seal passing through the intersection even when the tank is loaded with LNG. Even when the tank is loaded with LNG, the thermal contractions of the insulating seals do not thus create channels between the insulating seal accommodated in the second series of inter-panel spaces and the insulating seal passing through the intersection.

According to one embodiment, said insulating seal accommodated in the second series of inter-panel spaces includes an insulating foam having a lower compressive modulus in the second alignment direction than the compressive modulus of the joint seal in said second alignment direction.

Due to these features, the pressing of the insulating seal accommodated in the second series of inter-panel spaces in its compressed state does not damage the insulating seal passing through the intersection. In particular, the insulating seals have a higher compressive modulus in their longitudinal direction than in their transverse direction. These features make it possible to prevent the insulating seal accommodated in the second series of inter-panel spaces from crushing the insulating seal passing through the intersection and damaging said insulating seal passing through the intersection, which might cause the creation of undesirable channels on chilling.

According to one embodiment, the intersection between the first series of inter-panel spaces and the second series of inter-panel spaces is a first intersection, the tank further including a third series of adjacent inter-panel spaces in pairs and aligned in a third alignment direction, said third alignment direction being parallel to the first alignment direction so that the second series of inter-panel spaces and the third series of inter-panel spaces jointly form a second intersection, a second series of outer insulating seals of the plurality of outer insulating seals and a second series of inner insulating seals of the plurality of inner insulating seals being arranged continuously in the inter-panel spaces of said third series of inter-panel spaces so that at least one of the outer insulating seals of said second series of outer insulating seals and the inner insulating seals of said second series of inner insulating seals forms a second joint seal passing through the second intersection, and said insulating seal accommodated in the second series of inter-panel spaces is arranged so that it is juxtaposed to said second joint seal.

According to one embodiment, the insulating seal accommodated in the second series of inter-panel spaces is accommodated in one of the outer portion and the inner portion of the corresponding inter-panel space of the second series of inter-panel spaces, the plurality of insulating seals further including an insulating seal accommodated in the other of the outer portion and the inner portion of said inter-panel space and passing through the intersection so that one of said outer insulating seals of the first series of outer insulating seals and the inner insulating seals of the first series of inner insulating seals are juxtaposed to said insulating seal accommodated in the other of the outer portion and the inner portion of said inter-panel space.

According to one embodiment, said insulating seal accommodated in the second series of inter-panel spaces is accommodated in the inner portion of the corresponding inter-panel space of the second series of inter-panel spaces, the tank further including a second insulating seal accommodated in the outer portion of said inter-panel space of the second series of inter-panel spaces and passing through the intersection so that an outer insulating seal of the first series of outer insulating seals is juxtaposed to said second insulating seal accommodated in the outer portion of said inter-panel space of the second series of inter-panel spaces and passing through the intersection.

According to one embodiment, said insulating seal accommodated in the second series of inter-panel spaces is accommodated in the outer portion of the corresponding inter-panel space of the second series of inter-panel spaces, the tank further including a second insulating seal accommodated in the inner portion of said inter-panel space of the second series of inter-panel spaces and passing through the intersection so that an inner insulating seal of the first series of inner insulating seals is juxtaposed to said second insulating seal accommodated in the inner portion of said inter-panel space of the second series of inter-panel spaces and passing through the intersection.

According to one embodiment, the tank includes a first plurality of series of adjacent inter-panel spaces in pairs and aligned in directions parallel to the first alignment direction and a second plurality of series of adjacent inter-panel spaces in pairs and aligned in directions parallel to the second alignment direction, inner and outer insulating seals such as those above being arranged continuously in one, several or each series of inter-panel spaces of the first plurality of series of inter-panel spaces.

According to one embodiment, insulating seals are accommodated in the inter-panel spaces of one, several or each series of inter-panel spaces of the second plurality of series of inter-panel spaces juxtaposed to an insulating seal accommodated in an inter-panel space of the first plurality of series of inter-panel spaces, preferably interposed and juxtaposed between two insulating seals each accommodated in an inter-panel space of two adjacent series of the first plurality of series of inter-panel spaces.

According to one embodiment, insulating seals accommodated in the inter-panel spaces of one, several or each series of inter-panel spaces of the second plurality of series of inter-panel spaces are made from insulating foam and have a lower compressive modulus than the compressive modulus of the insulating seals accommodated in the inter-panel spaces of the first plurality of series of inter-panel spaces.

According to one embodiment, the tank further includes a corrugated sealing membrane including a plurality of corrugations, the two adjacent insulating panels each including a groove in which a corrugation of said plurality of grooves is accommodated, said grooves being aligned and interrupted in line with the inter-panel space, the inner insulating seal being interposed between said grooves.

According to one embodiment, the inner insulating seal fills all of the space, in the direction of the thickness of the thermally insulating barrier, between a bottom of said grooves and the sealing membrane.

According to one embodiment, the inner insulating seal is accommodated in the inter-panel space in a compressed state between the sealing membrane and the outer insulating seals.

Such a tank can form part of an onshore storage installation, for example for storing LNG, or be installed in an inshore or offshore floating structure, particularly a methane carrier, a floating storage re-gasification unit (FSRU), a floating production storage and offloading unit (FPSO) or other structure. Such a tank can also be used as a fuel tank on any type of vessel.

According to one embodiment, the invention also provides a vessel for transporting a cold liquid product that includes a double hull and an aforementioned tank arranged in the double hull.

According to one embodiment, the invention also provides a method for loading or unloading such a vessel, in which a cold liquid product is conveyed through insulated pipes from or to a floating or onshore storage installation from or to the tank of the vessel.

According to one embodiment, the invention also provides a system for transferring a cold liquid product, the system including the aforementioned vessel, insulated pipes arranged so that they connect the tank installed in the hull of the vessel to a floating or onshore storage installation and a pump for conveying a stream of cold liquid product through the insulated pipes from or to the floating or onshore storage installation to or from the tank of the vessel.

BRIEF DESCRIPTION OF THE FIGURES

The invention will be more clearly understood, and further aims, features and advantages thereof will become more apparent from the following description of several specific embodiments of the invention, given by way of non-limitative illustration only, with reference to the attached drawings.

DESCRIPTION OF THE EMBODIMENTS

By convention, the terms "outer" and "inner" are used to define the position of one element in relation to another, by reference to the inside and the outside of the tank. An element close to or facing the inside of the tank is thus described as inner as opposed to an element close to or facing the outside of the tank, which is described as outer.

A sealed and thermally insulating tank for storing and transporting a cryogenic fluid, for example Liquefied Natural Gas (LNG) includes a plurality of tank walls each having a multi-layer structure.

Figure 1:
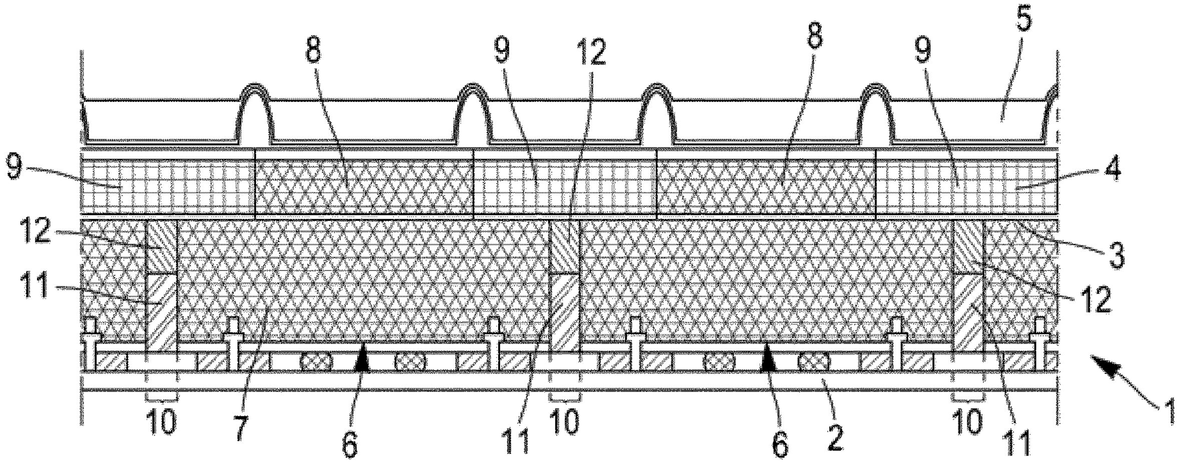
FIG. 1 is a cross-sectional view of a portion of a sealed and thermally insulating tank.

FIG. 1 shows a portion of tank wall having such a multi-layer structure including, from the outside to the inside of the tank, a secondary thermally insulating barrier 1 resting against a load-bearing structure 2, a secondary sealing membrane 3 resting against the secondary thermally insulating barrier 1, a primary thermally insulating barrier 4 resting against the secondary sealing membrane 3 and a primary sealing membrane 5 suitable for being in contact with the liquefied gas contained in the tank.

The load-bearing structure 2 can particularly be a self-supporting metal sheet or, more generally, any type of rigid partition having appropriate mechanical properties. The load-bearing structure can particularly be formed by the hull or double hull of a vessel. The load-bearing structure includes a plurality of walls defining the general shape of the tank, which is usually a polyhedral shape.

In addition, the thermally insulating barriers 1, 4 can be produced in a number of ways, and from a number of materials. In FIG. 1, for example, the thermally insulating barriers 1, 4 each include a plurality of parallelepipedal insulating panels juxtaposed in a regular pattern. More particularly, the tank wall is made up of prefabricated blocks 6 including a parallelepipedal secondary insulating panel 7, a portion of secondary sealing membrane 3 covering the secondary insulating panel 7, a parallelepipedal primary insulating panel 8 resting on the portion of secondary sealing membrane 3. This primary insulating panel 8 has dimensions smaller than the dimensions of the secondary insulating panel 7 so that a peripheral border of the portion of secondary sealing membrane 3 is left uncovered.

In order to form the tank wall, such prefabricated blocks 6 are juxtaposed in a regular pattern on the load-bearing structure 2. The continuity of the secondary sealing membrane 3 is ensured by connecting sealing strips connecting the peripheral borders of the portions of secondary sealing membrane 3 of the adjacent prefabricated blocks. In addition, intermediate insulating panels 9 are arranged between the primary insulating panels 8 of the prefabricated blocks in order to complete the primary thermally insulating barrier 4 and form a flat supporting surface for the primary sealing membrane 5.

The insulating panels 7, 8, 9 are for example made from blocks of polyurethane foam. Such polyurethane foam block insulating panels 7, 8, 9 can further include a cover plate and/or a bottom plate, for example made from plywood. In addition, the portion of secondary sealing membrane 3 of the prefabricated blocks is for example formed by a rigid laminated sealing film including a metal sheet interposed between two layers of resin-coated glass fibers. The connecting sealing strip connecting the peripheral borders of the portions of secondary sealing membrane 3 of the adjacent prefabricated blocks is for example formed by a flexible laminated sealing film including a metal sheet interposed between two layers of non-resin-coated glass fibers, for example a flexible sealing film known by the name Triplex®.

By way of example, such tanks are described in patent applications WO14057221 and FR2691520.

As illustrated in FIG. 1, the juxtaposition of the insulating panels 7 to form a secondary thermally insulating barrier 1 creates the presence of inter-panel spaces 10 between two adjacent secondary insulating panels 7. In other words, an inter-panel space 10 separates the facing lateral faces of two adjacent secondary insulating panels 7. In order to ensure the continuity of the insulation in the secondary thermally insulating barrier 7, insulating seals are inserted into the inter-panel space 10 separating the two facing lateral faces of the two adjacent secondary insulating panels 7.

More particularly, an outer insulating seal 11 is arranged in an outer portion, i.e. close to the load-bearing structure 2, of the inter-panel space 10, and an inner insulating seal 12 is inserted into an inner portion, i.e. close to the secondary sealing membrane 3, of the inter-panel space 10.

Each insulating seal 11, 12 includes an insulating compressible material. This insulating compressible material is for example covered with a sleeve of material that fully or partially surrounds the insulating compressible material and forms a pocket in which it is possible to create a vacuum in order to compress said insulating compressible material. The insulating compressible material can be made from a number of materials. The compressible material is for example glass wool, rock wool or insulating foam such as a low-density polyurethane foam or a melamine foam.

These insulating seals 11, 12 are gas-permeable so that they ensure the continuity of the secondary thermally insulating barrier 7 while allowing the circulation of gas such as an inert gas, for example nitrogen, within the secondary thermally insulating barrier 7. Such circulation of gas within the secondary thermally insulating barrier 7 makes it possible to maintain an inert atmosphere in said secondary thermally insulating barrier 7. Maintaining an inert atmosphere in the secondary thermally insulating barrier 7 prevents fuel gas from being in an explosive concentration range and/or makes it possible for example to create a vacuum in said secondary thermally insulating barrier in order to increase the insulating property thereof. This circulation of gas is also important to facilitate the detection of any fuel gas leaks during leak testing of the secondary sealing membrane 3.

For example, these insulating seals 11, 12 can include a core of compressible porous material covered with a sleeve. Such a compressible material is, for example, made from glass wool, rock wool or low-density insulating foam. The sleeve surrounding the core defines an inner space of the insulating seal 11, 12 and advantageously has a sufficiently low leakage rate to allow the creation of a vacuum in said inner space suitable for compressing the insulating seal 11, 12. This sleeve however has a sufficiently high leakage rate to allow the circulation of gas through the insulating seal to create an inert atmosphere in the thermally insulating barrier or for a leak test. Such a sleeve is for example made from kraft paper, a composite material or a polymer film. In one embodiment, for example, different sleeve parts are assembled together to define the inner space and the joint between these different sleeve parts is not completely sealed so that it has a leakage rate sufficient to allow the selective creation of a vacuum but insufficient to maintain the vacuum in the inner space when the vacuum ceases to be created. Such insulating seals are for example described in WO2019155158.

Figure 8:
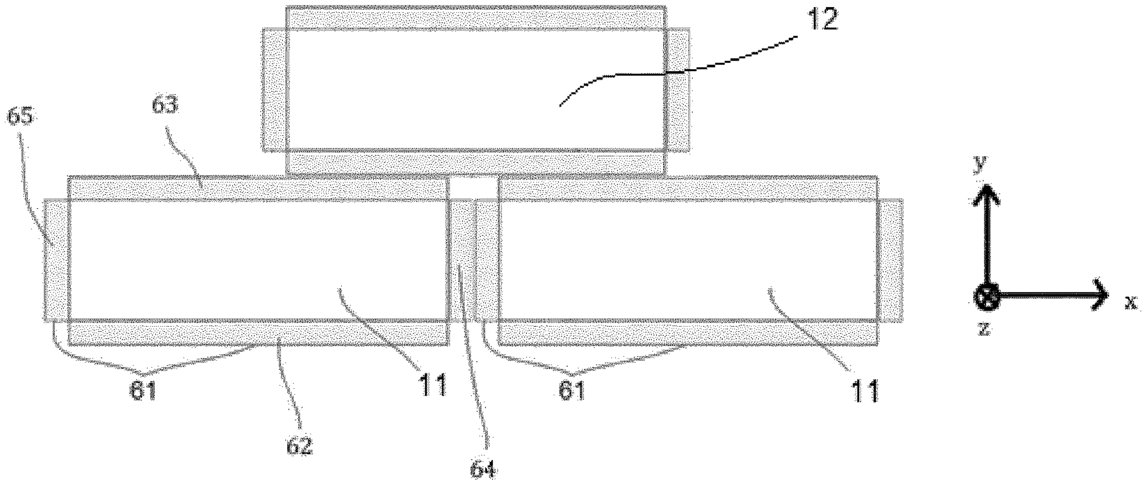
FIG. 8 is a cross-sectional view of an inner insulating seal and outer insulating seals in a plane orthogonal to the transverse direction of the inter-panel space.

In one embodiment illustrated in FIG. 8, the insulating seals 11 and 12 are a rectangular parallelepipedal shape and include four compressible insulating strips 62, 63, 64, 65 respectively parallel in pairs. More particularly, the compressible insulating strips 62, 63 are respectively situated on the faces opposite each other in the direction of the thickness of the thermally insulating barrier (arrow Y) and the compressible strips 64, 65 are respectively situated on the faces opposite each other in the longitudinal direction of the inter-panel space (arrow X). The two opposite faces in the transverse direction of the inter-panel space (arrow Z) are not covered with compressible insulating strips. The compressible insulating strips are made from a material selected from: polyurethane foam, polyvinyl chloride (PVC) foam, polystyrene, cotton wool and rock wool. The thickness of the compressible insulating strip is between 3 millimeters (mm) and 80 mm, preferably between 5 mm and 50 mm, for example 5 mm.

The compressible insulating material has an elasticity allowing the insulating seals 11, 12 to adopt a compressed state under the effect of a stress and to return to their initial shape in the absence of this stress. In addition, the insulating seals 11, 12 are parallelepipedal. This parallelepipedal shape complements the shape of the inter-panel space 10 defined by the lateral faces of the secondary insulating panels 7. These insulating seals 11, 12 are sized so that in the absence of stress, i.e. in their initial shape, said insulating seals have a width larger than the width of the inter-panel space 10.

For the insertion of the insulating seals 11, 12 into the inter-panel space, the insulating seals 11, 12 are compressed, for example by the creation of a vacuum in the space defined by the sleeve of said insulating seals 11, 12, in order to adopt a compressed state in which said insulating seals have a width smaller than the width of the inter-panel space. The insulating seals 11, 12 can thus be inserted easily into the inter-panel space 10. When an insulating seal 11, 12 is positioned in the inter-panel space 10, the vacuum is removed from the space defined by the sleeve so that said insulating seal 11, 12 extends and fills the inter-panel space. As the insulating seal 11, 12 has, in the free state, a width larger than the width of the inter-panel space 10, the insulating seal 11, 12 then adopts a semi-expanded state in which it completely fills the width of the inter-panel space 10 and is constrained by the lateral faces of the secondary insulating panels 7 defining said inter-panel space 10.

Figure 2:
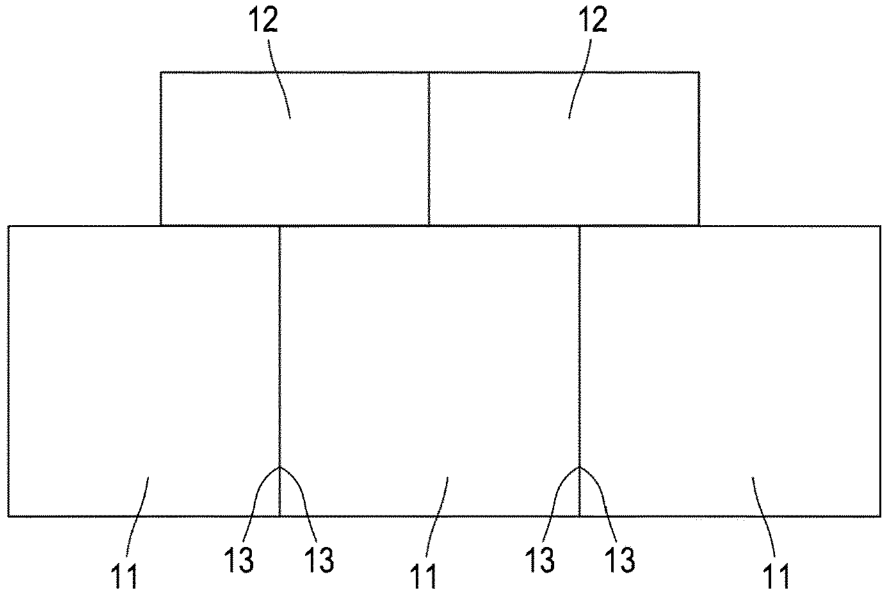
FIG. 2 is a diagrammatic representation of an arrangement of inner and outer insulating seals in the inter-panel spaces.

FIG. 2 illustrates the arrangement of the insulating seals 11, 12 in the inter-panel space 10. In FIG. 2, the outer insulating seals 11 are juxtaposed in pairs so that each edge. In FIG. 2, two outer seals 11 are thus juxtaposed so that they have adjacent edges 13.

Preferably, when the tank is manufactured, the outer insulating seals 11 are arranged so that said adjacent edges 13 are in contact in order to prevent the formation of channels extending in the direction of the thickness of the secondary thermally insulating barrier 1, as such channels can create convection prejudicial to the insulating qualities of the secondary thermally insulating barrier 1. When the tank is chilled, however, the thermal contraction of said outer insulating seals 11 can separate the adjacent edges 13 and create such channels. In order to prevent such channels from extending through the entire thickness of the secondary thermally insulating barrier, which would further promote the natural convection phenomena, an inner insulating seal 12 is superposed, in the direction of the thickness of the secondary thermally insulating barrier 7, on two juxtaposed outer insulating seals 12 so that it covers the adjacent edges 13 of said outer insulating seals. In other words, the inner insulating seal 12 is in line with the interface between two outer insulating seals 11 so that if a channel is formed between the adjacent edges 13 of the two outer insulating seals 11, said channel can only extend in the direction of the thickness of the thermally insulating barrier over the outer portion of the inter-panel space 10 in which the outer insulating seals 11 are accommodated.

Likewise, an outer insulating seal 11 is covered by two inner insulating seals 12 so that the interface between two adjacent inner insulating seals 11 is situated in line with an outer insulating seal 12. A channel can thus only be created in the direction of the thickness of the secondary thermally insulating barrier 1 over the inner portion of the inter-panel space 10.

The length dimensions of the outer insulating seals 11 and the inner insulating seals 12 are selected so that the interfaces between two outer insulating seals 11 of a series of aligned outer insulating seals 11 are always covered by a respective inner insulating seal 11. For example the outer insulating seals 11 and the inner insulating seals 12 have the same length and are in a staggered arrangement.

As illustrated in FIG. 2, however, the outer insulating seals 11 and the inner insulating seals 12 can have different height dimensions, taken in the direction of the thickness of the secondary thermally insulating barrier 7. It is thus possible to adjust the size, in the direction of the thickness of the secondary thermally insulating barrier 7, of the channels that might form at the interfaces between the outer insulating seals 11 or of the inner insulating seals 12. In the example illustrated in FIG. 2, the inner insulating seals 12 have a height smaller than the height of the outer insulating seals 11, so that the channels that might potentially appear in the inner portion of the inter-panel space 10, which are therefore closest to the inside of the tank and the LNG and therefore most subject to the temperature variations, have a reduced height relative to the channels that might appear in the outer portion of the inter-panel space.

Figure 3:
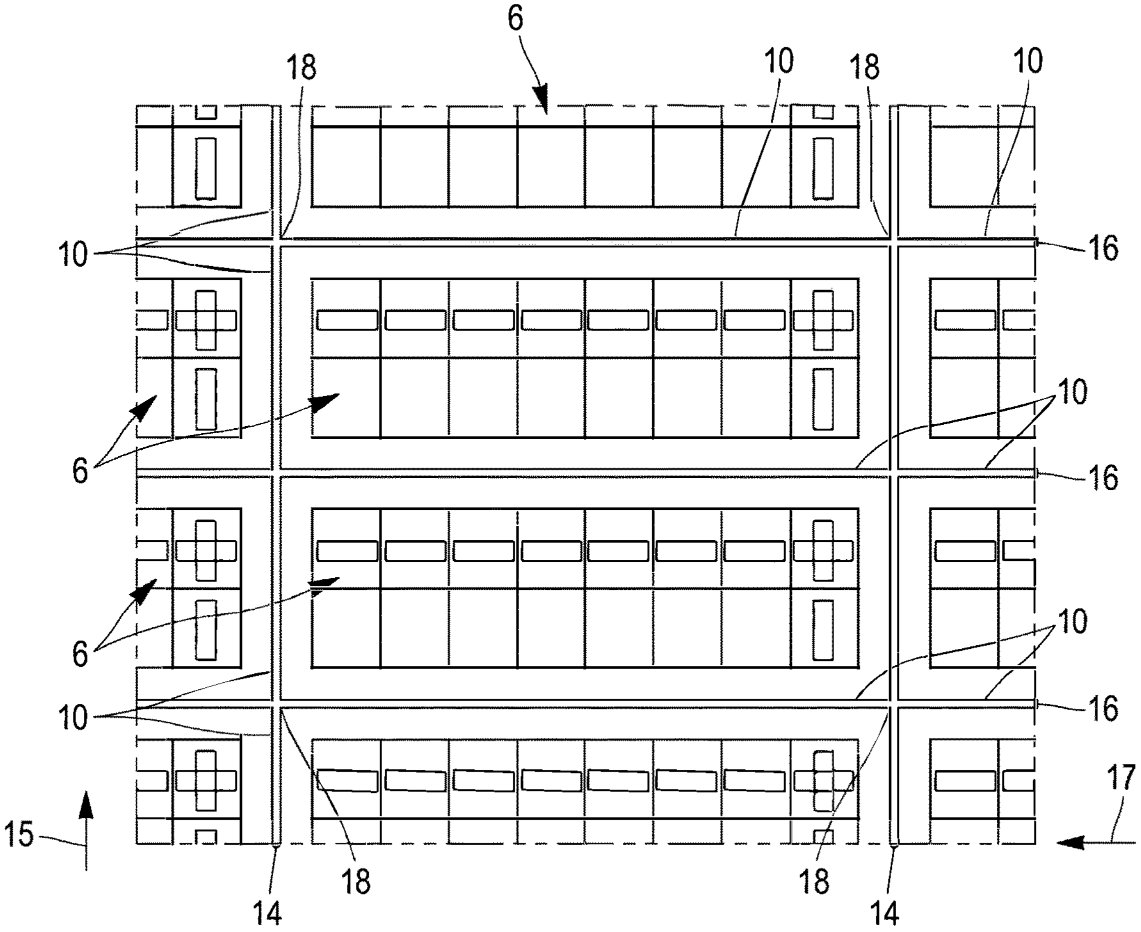
FIG. 3 is a top view of a portion of a sealed and thermally insulating tank shown partially and including inner and outer insulating seals arranged according to a first embodiment in inter-panel spaces.

FIG. 3 illustrates a top view of a portion of a sealed and thermally insulating tank in which only the prefabricated blocks 6 are illustrated. As illustrated in FIG. 3, the prefabricated blocks 6 juxtaposed in a regular pattern define first series 14 of inter-panel spaces 10 aligned parallel to a first alignment direction 15 and second series of inter-panel spaces 16 aligned parallel to a second alignment direction 17. The first alignment direction 15 and the second alignment direction 17 are perpendicular, so that the first series 14 are secant to the second series 16 at intersections 18.

According to the first embodiment illustrated in FIG. 3, for each wall of the tank, a preferred direction is selected in which the insulating seals are arranged continuously according to the arrangement explained with reference to FIG. 2, typically a staggered arrangement. Preferably, the preferred direction is selected with a component perpendicular to Earth's gravity in order to further limit the natural convection phenomena. For the bottom and ceiling walls of the tank, priority will be given to the dimension that simplifies the installation of the insulating seals in the second series 16.

In the example illustrated in FIG. 3, the first alignment direction 15 is selected as the preferred direction. Series of outer insulating seals 11 are thus juxtaposed in succession edge-to-edge along the entire length of the first series 14. As a result, one or a plurality of outer insulating seals 11 are accommodated jointly in two successive inter-panel spaces 10 of said first series 14 and pass through the corresponding intersections 18. Likewise, one or a plurality of inner insulating seals 12 are accommodated jointly in two successive inter-panel spaces 10 of said first series 14 and pass through the corresponding intersections 18. As explained above with reference to FIG. 2, each of said inner insulating seals 12 is superposed on the adjacent edges 13 of two outer insulating seals 11.

Because the insulating seals 11, 12 of the first series 14 pass through the intersections 18, however, it is not possible to arrange the insulating seals 11, 12 continuously in an identical manner in the second series 16, as at least some of the intersections 18 are already occupied by outer and/or inner insulating seals 11, 12 passing through said intersections 18.

Figure 4:
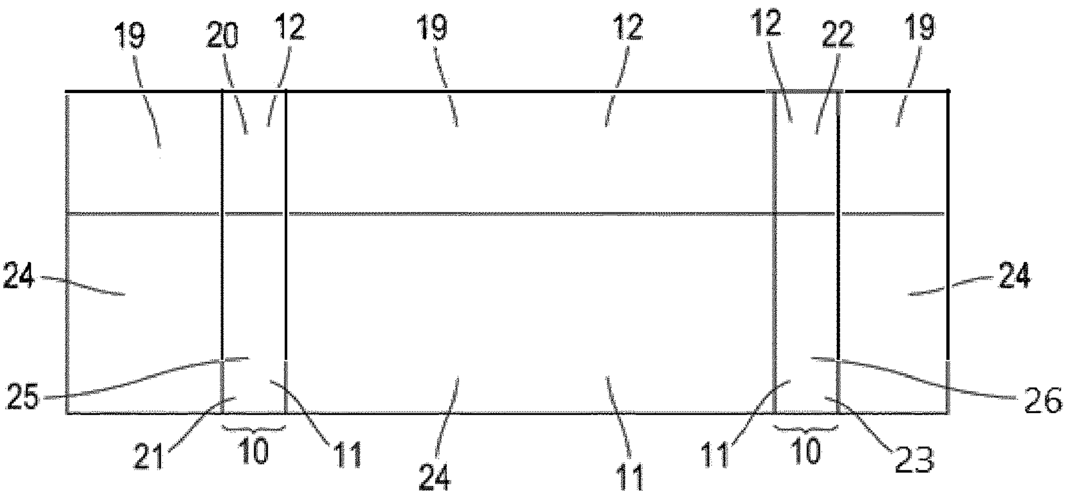
FIG. 4 is a cross-sectional view of a portion of the secondary thermally insulating barrier in FIG. 3 in line with a series of insulating seals arranged according to a first embodiment.

According to a first embodiment illustrated in FIG. 4, outer insulating seals 11 and inner insulating seals 12 are accommodated in the inter-panel spaces 10 of the second series 16 but in a non-offset manner, typically these insulating seals 11, 12 are not necessarily installed in a staggered arrangement. In other words, the inner insulating seals 12 accommodated in the inter-panel spaces 10 of the second series 16 are not necessarily in line with the interfaces between two juxtaposed outer insulating seals 11.

An inner insulating seal 19 illustrated in FIG. 4 is accommodated in the inner portion of an inter-panel space 10 in a second series 16, interposed between an inner insulating seal 20 accommodated in one of the first series 14 and passing through a first intersection 21 and an inner insulating seal 22 accommodated in one of the first series 14 and passing through a second intersection 23, the first intersection 21 and the second intersection 23 being adjacent. In other words, the inner insulating seals 20 and 22 are in two adjacent first series 14.

The insulating seals 11, 12 of the second series 16 are arranged in the inter-panel spaces 10 in a compressed state in their longitudinal direction, i.e. in the second alignment direction 17. This compression is greater than or equal to the compression of said insulating seals 11, 12 due to the thermal contraction during use.

In order to have a joint with the insulating seals 11, 12 of the first series 14, i.e. a joint at the intersections 18 limiting the potential formation of channels in the direction of the thickness of the secondary thermally insulating barrier 7, the insulating seals 11, 12 accommodated in the inter-panel spaces 10 of the second series 16 are made from a material having a lower compressive modulus in their longitudinal direction, i.e. in the second alignment direction 17, than the compressive modulus of the insulating seals 11, 12 accommodated in the inter-panel spaces 10 of the first series 14 in their transverse direction, i.e. in the second alignment direction 17. These insulating seals 11, 12 of the second series do not thus exert excessive pressure on the insulating seals 11, 12 of the first series and do not therefore damage said insulating seals 11, 12 of the first series while maintaining contact preventing the creation of channels in the direction of the thickness. Taking the example of the inner insulating seal 19, this inner insulating seal 19 is compressed and pressing against the inner insulating seals 20 and 22, this pressure preventing the formation of channels without however damaging the inner insulating seals 20 and 22.

An outer insulating seal 24 is accommodated in a similar way to the inner insulating seal 19 in the outer portion of an inter-panel space 10 of a second series 16, interposed between an outer insulating seal 25 accommodated in one of the first series 14 and passing through the first intersection 21 and an outer insulating seal 26 accommodated in one of the first series 14 and passing through the second intersection 23.

In an alternative, not illustrated, the inner and outer insulating seals 19, 24 can be made in one piece. In other words, a single insulating seal can be accommodated in the inter-panel space 10 of the second series 16, extending through the entire thickness of the secondary thermally insulating barrier 7.

Figure 5:
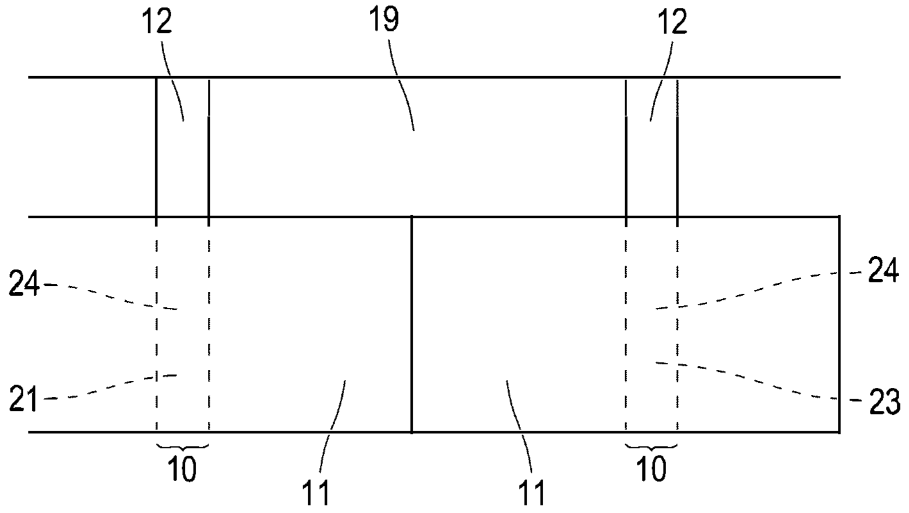
FIG. 5 is a cross-sectional view of a portion of the secondary thermally insulating barrier in FIG. 3 in line with a series of insulating seals arranged according to a second embodiment.

According to a second embodiment illustrated in FIG. 5, one alignment direction is preferred for the inner portion of the inter-panel spaces 10 and the other alignment direction is preferred for the outer portion of the inter-panel spaces 10. In the example illustrated in FIG. 5, inner insulating seals 12 are thus arranged continuously, and therefore passing through intersections 18, in the first series 14, and inner insulating seals 19 as described above with reference to FIG. 4 are arranged in the inner portions of the second series 16, interposed and pressing against the inner insulating seals 12 passing through the intersections 18. In addition, outer insulating seals 11 are arranged continuously, and therefore passing through intersections 18, in the second series 16, and inner insulating seals 24 as described above with reference to FIG. 4 are arranged in the outer portions of the first series 14, interposed and pressing against the outer insulating seals 11 passing through the intersections 18.

In one example, not illustrated, this arrangement could be reversed so that the inner insulating seals 12 are arranged continuously in the second series 16 and the outer insulating seals 11 are arranged continuously in the first series 14.

The technique described above for producing a sealed and thermally insulating tank can be used in different types of reservoir, for example to form an LNG reservoir in an onshore installation or in a floating structure such as a methane carrier or other vessel.

Figure 7:
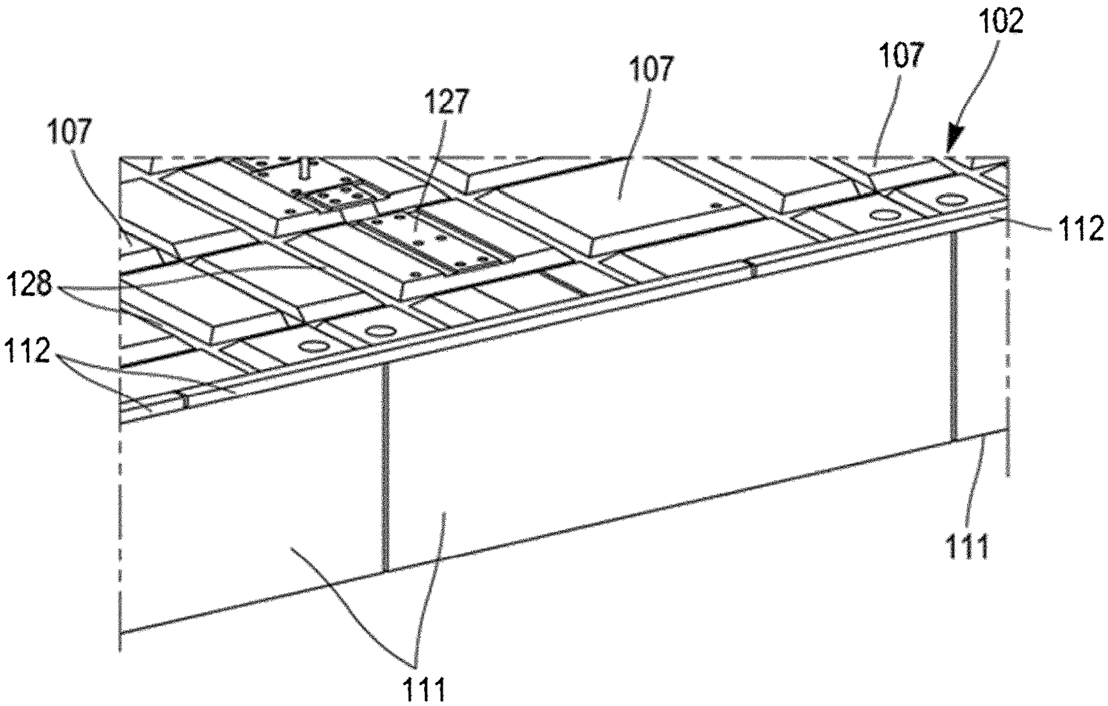
FIG. 7 is a diagrammatic perspective view of a portion of secondary thermally insulating barrier of a sealed and thermally insulating tank according to a variant embodiment.

FIG. 7 illustrates a diagrammatic perspective view of a portion of secondary thermally insulating barrier according to a variant embodiment. In this figure, identical elements or elements that perform the same function as elements described above have the same reference sign increased by 100.

In this variant embodiment, the secondary sealing membrane is formed by corrugated metal plates (not illustrated). These metal plates are butt welded and are anchored to anchoring strips 127 formed on the inner surfaces of the secondary insulating panels 107. These metal plates have corrugations protruding towards the outside of the tank.

In order to accommodate these corrugations, the secondary insulating panels 107 have grooves 128. Such grooves 128 however form networks of channels in the secondary thermally insulating barrier 102. These networks of channels promote convection, in particular when they have a vertical component, and reduce the insulating properties of the secondary thermally insulating barrier 102.

By way of example, such a sealed and thermally insulating tank having a sealing membrane formed by corrugated metal plates the corrugations of which are accommodated in grooves of the thermally insulating barrier is described in patent application WO2019102163.

In the variant illustrated in FIG. 7, the inner insulating seals 112 are arranged to act as a plug for the channels formed by the successive grooves 128. In other words, two successive grooves 128 aligned to accommodate a corrugation of the secondary sealing membrane are separated by the inner insulating seal 112.

In order not to hinder the installation of the corrugation in the grooves 128, the inner insulating seal 112 can be made from a compressible material. When the metal plates are anchored to the secondary thermally insulating barrier 102, the corrugation accommodated in the grooves 128 compresses the inner insulating seal 112, the inner insulating seal 112 thus plugging a whole section of the channel formed by the successive grooves 128 between the corrugation and a bottom of said grooves 128. Preferably, such an inner insulating seal formed from a compressible material is gas-permeable to create a pressure drop in the channel formed by the grooves 128 while permitting the circulation of gas such as an inert gas, as explained above.

In a variant embodiment, not illustrated, an inner face of the insulating seal 112 can also include a recess corresponding to the shape of the corrugation so as to limit, or even eliminate, the compression of said inner insulating seal 112 by the corrugation.

Figure 6:
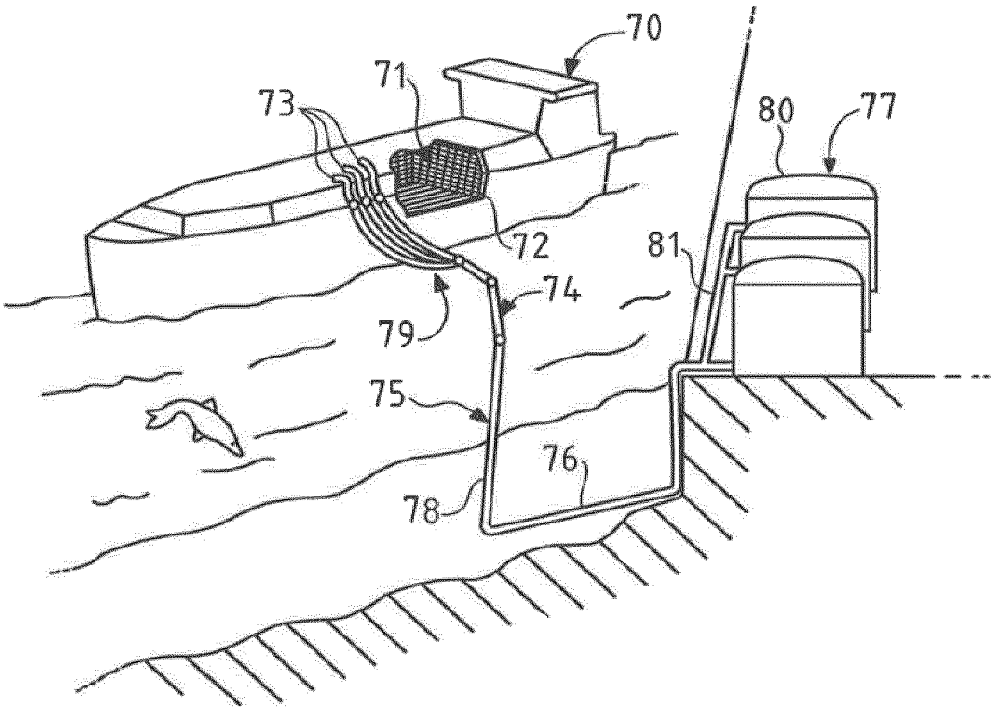
FIG. 6 is a cut-away diagrammatic representation of a methane carrier tank and a terminal for loading/unloading this tank.

With reference to FIG. 6, a cut-away view of a methane carrier 70 shows a sealed and insulated tank 71 with a generally prismatic shape assembled in the double hull 72 of the vessel. The wall of the tank 71 includes a primary sealing barrier suitable for being in contact with the LNG contained in the tank, a secondary sealing barrier arranged between the primary sealing barrier and the double hull 72 of the vessel, and two insulating barriers respectively arranged between the primary sealing barrier and the secondary sealing barrier and between the secondary sealing barrier and the double hull 72.

In a manner known per se, loading/unloading pipes 73 arranged on the upper deck of the vessel can be connected, by means of appropriate connectors, to a marine or harbor terminal in order to transfer a cargo of LNG from or to the tank 71.

FIG. 6 shows an example of a marine terminal including a loading and unloading station 75, a subsea pipeline 76 and an onshore installation 77. The loading and unloading station 75 is a fixed offshore installation including a mobile arm 74 and a tower 78 that supports the mobile arm 74. The mobile arm 74 holds a bundle of insulated flexible hoses 79 that can be connected to the loading/unloading pipes 73. The orientable mobile arm 74 is suitable for all sizes of methane carrier. A connecting pipeline, not shown, extends inside the tower 78. The loading and unloading station 75 makes it possible to load and unload the methane carrier 70 from or to the onshore installation 77. The latter includes liquefied gas storage tanks 80 and connecting pipelines 81 connected by the subsea pipeline 76 to the loading or unloading station 75. The subsea pipeline 76 makes it possible to transfer liquefied gas between the loading or unloading station 75 and the onshore installation 77 over a long distance, for example 5 km, which makes it possible to keep the methane carrier 70 a long distance from the coast during the loading and unloading operations.

In order to generate the pressure necessary for transferring the liquefied gas, pumps on board the vessel 70 and/or pumps provided at the onshore installation 77 and/or pumps provided on the loading and unloading station 75 are implemented.

Although the invention has been described with reference to several specific embodiments, it is obvious that it is in no way limited thereto and that it comprises all technical equivalents of the means described and any combinations thereof if these fall within the scope of the invention as defined by the claims.

FIGS. 1 to 5 and 7 thus illustrate the case of insulating seals accommodated in the inter-panel spaces 10 of the secondary thermally insulating barrier 1, but such insulating seals could be arranged in a similar way in the primary thermally insulating barrier 4.

Likewise, the description above is given in the context of prefabricated blocks 6 defining inter-panel spaces 10, but this description could apply in a similar way to any type of thermally insulating barrier including insulating panels defining inter-panel spaces such as plywood chambers filled with insulating or other material.

The use of the verb "include" or "comprise" and its conjugated forms does not rule out the presence of elements or steps other than those set out in a claim.

In the claims, any reference sign in brackets cannot be interpreted as limiting the claim.

The invention claimed is:

1. A sealed and thermally insulating tank including a thermally insulating barrier suitable for being anchored to a load-bearing structure, the thermally insulating barrier including two adjacent insulating panels, an inter-panel space being defined between the two adjacent insulating panels, said inter-panel space including an outer portion and an inner portion that are superposed in the direction of the thickness of the thermally insulating barrier, the outer portion and the inner portion being further away from and closer to the inside of the tank respectively, the tank further including:

two outer insulating seals juxtaposed in the outer portion of the inter-panel space so that they have two adjacent edges, and an inner insulating seal arranged in the inner portion of the inter-panel space, the inner insulating seal being superposed in the direction of the thickness of the thermally insulating barrier on the two outer insulating seals so that it covers the two adjacent edges of said outer insulating seals, and wherein the outer insulating seals and/or the inner insulating seal further comprise a core of compressible porous material and a sleeve fully or partially surrounding said core.

2. A sealed and thermally insulating tank including a thermally insulating barrier suitable for being anchored to a load-bearing structure, the thermally insulating barrier including two adjacent insulating panels, an inter-panel space being defined between the two adjacent insulating panels, said inter-panel space including an outer portion and an inner portion that are superposed in the direction of the thickness of the thermally insulating barrier, the outer portion and the inner portion being further away from and closer to the inside of the tank respectively, the tank further including:

two outer insulating seals juxtaposed in the outer portion of the inter-panel space so that they have two adjacent edges, and an inner insulating seal arranged in the inner portion of the inter-panel space, the inner insulating seal being superposed in the direction of the thickness of the thermally insulating barrier on the two outer insulating seals so that it covers the two adjacent edges of said outer insulating seals, and wherein one said outer insulating seal has, in the free state, a width larger than or equal to a width of the inter-panel space.

3. A sealed and thermally insulating tank including a thermally insulating barrier suitable for being anchored to a load-bearing structure, the thermally insulating barrier including two adjacent insulating panels, an inter-panel space being defined between the two adjacent insulating panels, said inter-panel space including an outer portion and an inner portion that are superposed in the direction of the thickness of the thermally insulating barrier, the outer portion and the inner portion being further away from and closer to the inside of the tank respectively, the tank further including:

a first outer insulating seal and a second outer insulating seal which are juxtaposed in the outer portion of the inter-panel space so that they have two adjacent edges, and an inner insulating seal arranged in the inner portion of the inter-panel space, the inner insulating seal being superposed in the direction of the thickness of the thermally insulating barrier on the two outer insulating seals so that it covers the two adjacent edges of said outer insulating seals, and wherein said second outer insulating seal is juxtaposed to said first outer insulating seal in a longitudinal direction of the inter-panel space in order that the second outer insulating seal is arranged in an extension of the first outer insulating seal according to the longitudinal direction of the inter-panel space.

4. The sealed and thermally insulating tank as claimed in claim 3, in which the inner insulating seal and/or the first and second outer insulating seals are gas-permeable.

5. The sealed and thermally insulating tank as claimed in claim 3, in which the inner insulating seal has, in the free state, a width larger than a width of one said outer insulating seal in the free state.

6. The sealed and thermally insulating tank as claimed in claim 3, in which one said outer insulating seal has, in the free state, a width larger than or equal to a width of the inter-panel space.

7. The sealed and thermally insulating tank as claimed in claim 3, in which the outer and inner insulating seals are made from solid materials and have elastic properties so that they can adopt, under the action of a compressive stress, a compressed state in which said insulating seals have a width smaller than a width of the inter-panel space so that they can be inserted into said inter-panel space and, when said insulating seals are inserted into said inter-panel space and in the absence of said compressive stress, can adopt a semi-expanded state in which said insulating seals are constrained by the insulating panels forming the inter-panel space and fill the width of said inter-panel space.

8. The sealed and thermally insulating tank as claimed in claim 3, in which the outer insulating seals and the inner insulating seal have a different height in the direction of the thickness of the thermally insulating barrier.

9. The sealed and thermally insulating tank as claimed in claim 3, in which the outer and inner insulating seals are parallelepipedal.

10. The sealed and thermally insulating tank as claimed in claim 3, in which the outer insulating seals and the inner insulating seal have a rectangular parallelepipedal shape defined by first and second faces opposite each other in the direction of the thickness of the thermally insulating barrier, third and fourth faces opposite each other in a longitudinal direction of the inter-panel space, and fifth and sixth faces opposite each other in a transverse direction of the inter-panel space, and the outer insulating seals and the inner insulating seal each comprise a core of compressible material and at least one compressible insulating strip rigidly connected to the core of compressible material and forming at least one of the first face, second face, third face and fourth face of said outer or inner insulating seal.

11. A vessel for transporting a cold liquid product, the vessel including a double hull and the tank as claimed in claim 3 arranged in the double hull.

12. A system for transferring a cold liquid product, the system including the vessel as claimed in claim 11, insulated pipes arranged so that they connect the tank installed in the hull of the vessel to a floating or onshore storage installation and a pump for conveying a cold liquid product through the insulated pipes from or to the floating or onshore storage installation to or from the tank of the vessel.

13. A method for loading or unloading the vessel, the method comprising:

providing the vessel as claimed in claim 11, and conveying a cold liquid product through insulated pipes from or to a floating or onshore storage installation to or from the tank of the vessel.

14. A sealed and thermally insulating tank including a thermally insulating barrier suitable for being anchored to a load-bearing structure, the thermally insulating barrier including insulating panels juxtaposed in a regular pattern and inter-panel spaces, said inter-panel spaces each being defined by two of the adjacent insulating panels, said inter-panel spaces each including an outer portion and an inner portion superposed in the direction of the thickness of the thermally insulating barrier, the outer portion and the inner portion being respectively further away from and closer to the inside of the tank, the tank further including:

outer insulating seals arranged in the outer portions of the inter-panel spaces, said outer insulating seals being juxtaposed in pairs each including a first outer insulating seal and a second outer insulating seal so that they have two adjacent edges, and inner insulating seals arranged in the inner portions of the inter-panel spaces, said inner insulating seals being arranged superposed in the direction of the thickness of the thermally insulating barrier on two respective juxtaposed outer insulating seals so that it covers the adjacent edges of said two respective juxtaposed outer insulating seals, wherein the second outer insulating seal is juxtaposed to the first outer insulating seal in a longitudinal direction of the inter-panel space in order that the second outer insulating seal is arranged in an extension of the first outer insulating seal according to the longitudinal direction of the inter-panel space.

15. The sealed and thermally insulating tank as claimed in claim 14, in which the inter-panel spaces includes a first series of adjacent inter-panel spaces in pairs and aligned in a first alignment direction, and in which a first series of outer insulating seals of the outer insulating seals and a first series of inner insulating seals of the inner insulating seals are arranged continuously in the inter-panel spaces of said first series of inter-panel spaces so that at least one of the outer insulating seals of said first series of outer insulating seals and the inner insulating seals of said first series of inner insulating seals forms a joint seal that is arranged overlapping in two successive inter-panel spaces of the first series of inter-panel spaces.

16. The sealed and thermally insulating tank as claimed in claim 15, in which the first alignment direction has a vertical component.

17. The sealed and thermally insulating tank as claimed in claim 15, further including a second series of adjacent inter-panel spaces in pairs and aligned in a second alignment direction, the first alignment direction and the second alignment direction being secant so that said joint seal passes through an intersection between the first series of inter-panel spaces and the second series of inter-panel spaces, the tank further including an insulating seal accommodated in the second series of inter-panel spaces so that it is juxtaposed to said joint seal.

18. The sealed and thermally insulating tank as claimed in claim 17, in which said insulating seal accommodated in the second series of inter-panel spaces includes an insulating foam having a lower compressive modulus in the second alignment direction than the compressive modulus of the joint seal in said second alignment direction.

19. The sealed and thermally insulating tank as claimed in claim 18, in which the intersection between the first series of inter-panel spaces and the second series of inter-panel spaces is a first intersection, the tank further including a third series of adjacent inter-panel spaces in pairs and aligned in a third alignment direction, said third alignment direction being parallel to the first alignment direction so that the second series of inter-panel spaces and the third series of inter-panel spaces jointly form a second intersection, a second series of outer insulating seals of the outer insulating seals and a second series of inner insulating seals of the inner insulating seals being arranged continuously in the inter-panel spaces of said third series of inter-panel spaces so that at least one of the outer insulating seals of said second series of outer insulating seals and the inner insulating seals of said second series of inner insulating seals forms a second joint seal passing through the second intersection, and in which said insulating seal accommodated in the second series of inter-panel spaces is arranged so that it is juxtaposed to said second joint seal.

20. The sealed and thermally insulating tank as claimed in claim 18, in which said insulating seal accommodated in the second series of inter-panel spaces is accommodated in the inner portion of the corresponding inter-panel space of the second series of inter-panel spaces, the tank further including a second insulating seal accommodated in the outer portion of said inter-panel space of the second series of inter-panel spaces and passing through the intersection so that an outer insulating seal of the first series of outer insulating seals is juxtaposed to said second insulating seal accommodated in the outer portion of said inter-panel space of the second series of inter-panel spaces and passing through the intersection.

21. The sealed and thermally insulating tank as claimed in one of claim 17, in which said insulating seal accommodated in the second series of inter-panel spaces is accommodated in the outer portion of the corresponding inter-panel space of the second series of inter-panel spaces, the tank further including a second insulating seal accommodated in the inner portion of said inter-panel space of the second series of inter-panel spaces and passing through the intersection so that an inner insulating seal of the first series of inner insulating seals is juxtaposed to said second insulating seal accommodated in the inner portion of said inter-panel space of the second series of inter-panel spaces and passing through the intersection.

* * * * *